(12) United States Patent
Liu

(10) Patent No.: US 11,703,915 B2
(45) Date of Patent: Jul. 18, 2023

(54) ELASTIC STRETCH AND RETRACTION MECHANISM AND ELECTRONIC DEVICE

(71) Applicant: BEIJING XIAOMI MOBILE SOFTWARE CO., LTD., Beijing (CN)

(72) Inventor: Zhenhua Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 81 days.

(21) Appl. No.: 17/328,711

(22) Filed: May 24, 2021

(65) Prior Publication Data

US 2022/0129042 A1    Apr. 28, 2022

(30) Foreign Application Priority Data

Oct. 27, 2020    (CN) .......................... 202011167506.3

(51) Int. Cl.
*G06F 1/16*    (2006.01)
(52) U.S. Cl.
CPC .......... *G06F 1/1679* (2013.01); *G06F 1/1624* (2013.01); *G06F 1/1652* (2013.01); *G06F 1/1656* (2013.01)
(58) Field of Classification Search
CPC .... G06F 1/1679; G06F 1/1624; G06F 1/1652; G06F 1/1656; G09F 9/301; H05K 5/0047; H05K 5/0052
See application file for complete search history.

(56) References Cited

U.S. PATENT DOCUMENTS

| | | | |
|---|---|---|---|
| 2012/0162876 A1* | 6/2012 | Kim | G06F 1/1652 361/679.01 |
| 2016/0147261 A1* | 5/2016 | Bohn | G09F 9/35 455/566 |
| 2020/0366331 A1* | 11/2020 | Chen | G06F 1/1626 |

OTHER PUBLICATIONS

European Patent Application No. 21176766.0 extended Search and Opinion dated Nov. 24, 2021, 10 pages.

* cited by examiner

*Primary Examiner* — Anthony Q Edwards
*Assistant Examiner* — Mudakir Hussien
(74) *Attorney, Agent, or Firm* — Cozen O'Connor

(57) ABSTRACT

An elastic stretch and retraction mechanism for an electronic device is provided. The elastic stretch and retraction mechanism includes a fixed bracket, a guide member, a sliding member, and an elastic member. The fixed bracket is fixed to a housing assembly of the electronic device. The guide member is connected to the fixed bracket. The sliding member is slidably connected to the guide member. The sliding member is configured to connect with a stretch and retraction end of a flexible screen of the electronic device. The elastic member is arranged between the fixed bracket and the sliding member. The elastic member is configured to reset the sliding member. The flexible screen can easily and stably stretch and retract through the elastic stretch and retraction mechanism, which provides high operability and ensures the reliability of the use of the electronic device.

19 Claims, 8 Drawing Sheets ns assembly of the electronic device; a guide member connected to the fixed bracket; a sliding member slidably connected to the guide member, and configured to connect with a stretch and retraction end of a flexible screen of the electronic device; and an elastic member arranged between the fixed bracket and the sliding member, and configured to reset the sliding member.

ELASTIC STRETCH AND RETRACTION MECHANISM AND ELECTRONIC DEVICE

CROSS-REFERENCE TO RELATED APPLICATION

This application claims the benefit of priority to Chinese Patent Application Serial No. 202011167506.3, filed on Oct. 27, 2020, the entire content of which is incorporated herein by reference.

FIELD

The present disclosure relates to a technical field of electronic devices, and more particularly, to an elastic stretch and retraction mechanism and an electronic device.

BACKGROUND

With the development of flexible screen technology, many different forms of screens, for example, foldable screens, ring screens, and curved screens, have been designed for electronic devices. As the electronic device gets smaller and the battery gets more capacious, the electronic device can be designed in more flexible forms. If a flexible screen can be stretched and retracted, it may not only meet users' demands for the size of the screen, but it may also facilitate the miniaturization of the electronic device, thus improving user experience.

SUMMARY

An aspect of the present disclosure provides an elastic stretch and retraction mechanism for an electronic device. The elastic stretch and retraction mechanism includes: a fixed bracket fixed to a housing assembly of the electronic device; a guide member connected to the fixed bracket; a sliding member slidably connected to the guide member, and configured to connect with a stretch and retraction end of a flexible screen of the electronic device; and an elastic member arranged between the fixed bracket and the sliding member, and configured to reset the sliding member.

Another aspect of the present disclosure provides an electronic device, and the electronic device includes a housing assembly, at least one elastic stretch and retraction mechanism, and a flexible screen. The elastic stretch and retraction mechanism includes: a fixed bracket fixed to the housing assembly of the electronic device; a guide member connected to the fixed bracket; a sliding member slidably connected to the guide member;
and an elastic member arranged between the fixed bracket and the sliding member, and configured to reset the sliding member. The flexible screen includes at least one stretch and retraction end, part of the flexible screen being fixed to the housing assembly, the stretch and retraction end being connected to the sliding member of the elastic stretch and retraction mechanism, the stretch and retraction end being configured to drive the sliding member to slide outwards from the housing assembly to allow the flexible screen to stretch, and the stretch and retraction end is further configured to drive the sliding member to reset to allow the flexible screen to retract.

DETAILED DESCRIPTION

Figure 1:
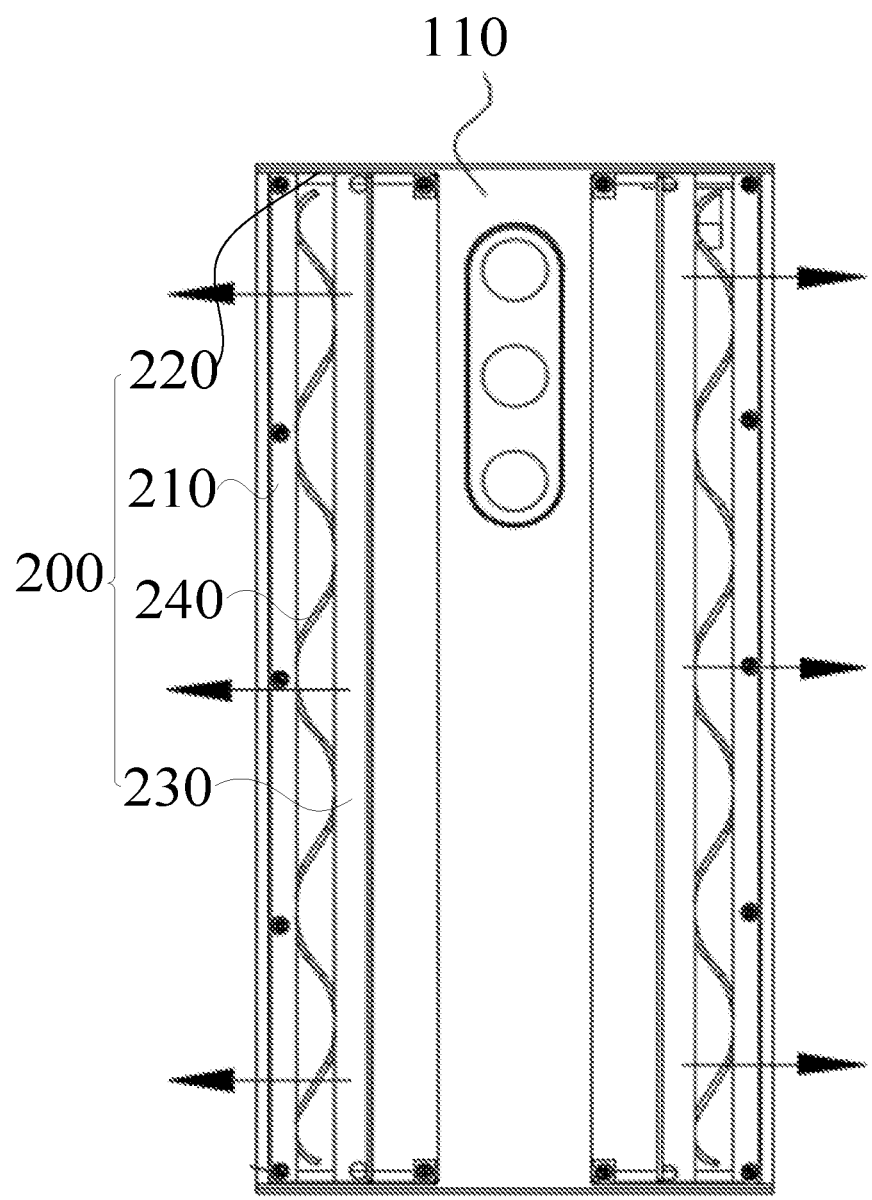
FIG. 1 is a partial schematic view of a flexible screen of an electronic device in a stretched state according to an illustrative embodiment of the present disclosure.

Illustrative embodiments will be described in detail here, and examples thereof are illustrated in the drawings. In the following description involving the drawings, the same numerals in the different drawings denote the same or similar elements, unless otherwise indicated. The embodiments described in the following illustrative embodiments are not representative of all embodiments consistent with the present disclosure. Rather, they are merely examples of apparatuses and methods consistent with some aspects of the present disclosure as detailed in the claims.

The terms used in the description of the present disclosure are for the purpose of describing particular embodiments only and are not intended to limit the present disclosure. Unless otherwise defined, the technical and scientific terms used in the present disclosure have the same meanings as commonly understood by those of ordinary skill in the art to which the present disclosure belongs. The terms, such as "first," "second," or the like, which are used in the specification and the claims of the present closure, are not intended to indicate any sequence, number or importance, but for distinguishing different components. Also, the terms, such as "one", "a/an," or the like, are not intended to limit the number, but for indicating the existence of at least one. Unless otherwise indicated, the terms, such as "comprise," "include," or the like, are intended to specify that the elements or the objects stated before these terms encompass the elements or the objects and equivalents thereof listed after these terms, but not preclude other elements or objects. The terms, such as "connect," "couple" or the like, are not intended to define a physical connection or mechanical connection, but may include an electrical connection/coupling, directly or indirectly.

The singular forms "a/an," "said," and "the" used in the specification and appended claims of the present disclosure are intended to include the plural forms as well, unless the context clearly indicates otherwise. It will also be understood that the term "and/or" as used herein refers to and encompasses any and all possible combinations of one or more of the associated listed items.

Flexible screens are designed in a variety of forms. As an example, a flexible screen may have a stretched state and a retracted state, which provides an electronic device with different sizes of display areas and improves a user experience. The flexible screen can easily and stably stretch and retract through an elastic stretch and retraction mechanism provided in the embodiments of the present disclosure.

Figure 2:
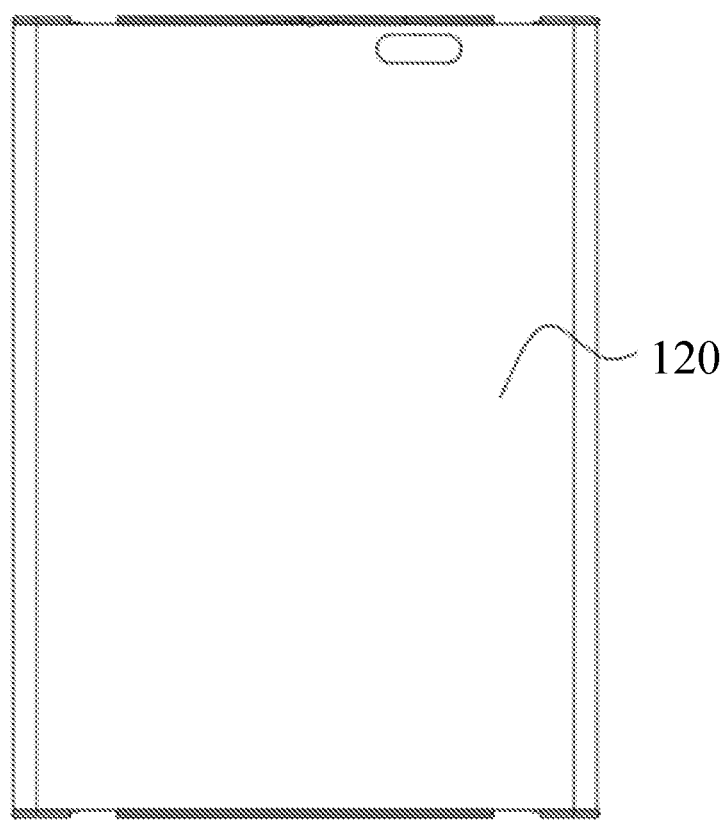
FIG. 2 is a front view of a flexible screen of an electronic device in a stretched state according to an illustrative embodiment of the present disclosure.
Figure 3:
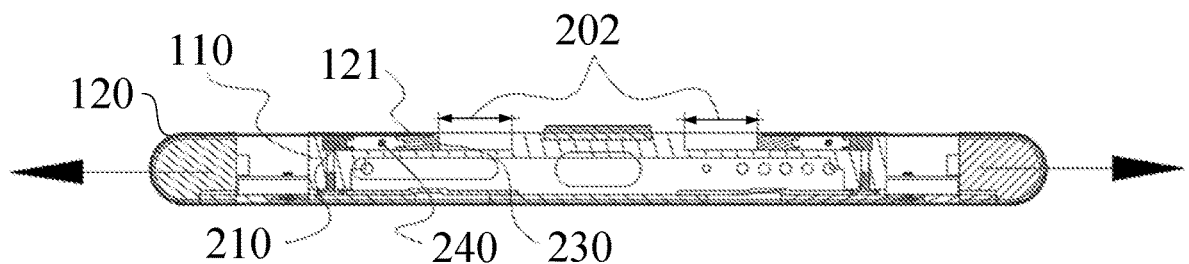
FIG. 3 is a partial sectional view of a flexible screen of an electronic device in a stretched state according to an illustrative embodiment of the present disclosure.
Figure 4:
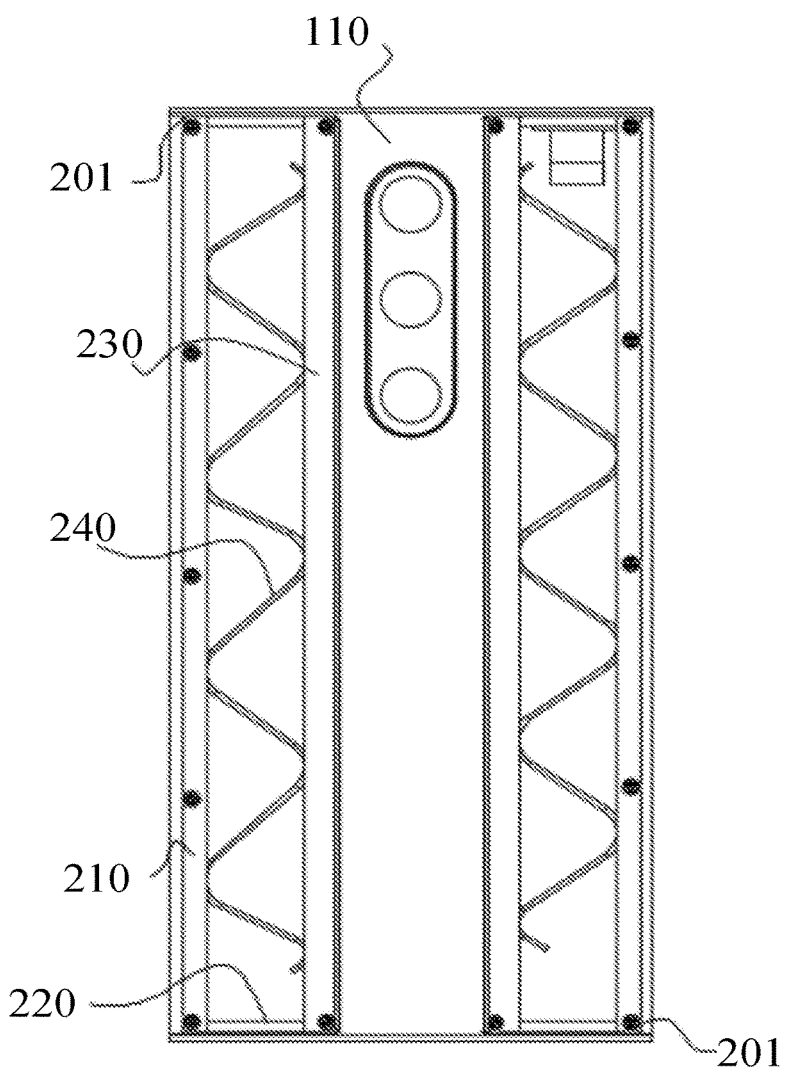
FIG. 4 is a partial schematic view of a flexible screen of an electronic device in a retracted state according to an illustrative embodiment of the present disclosure.
Figure 5:
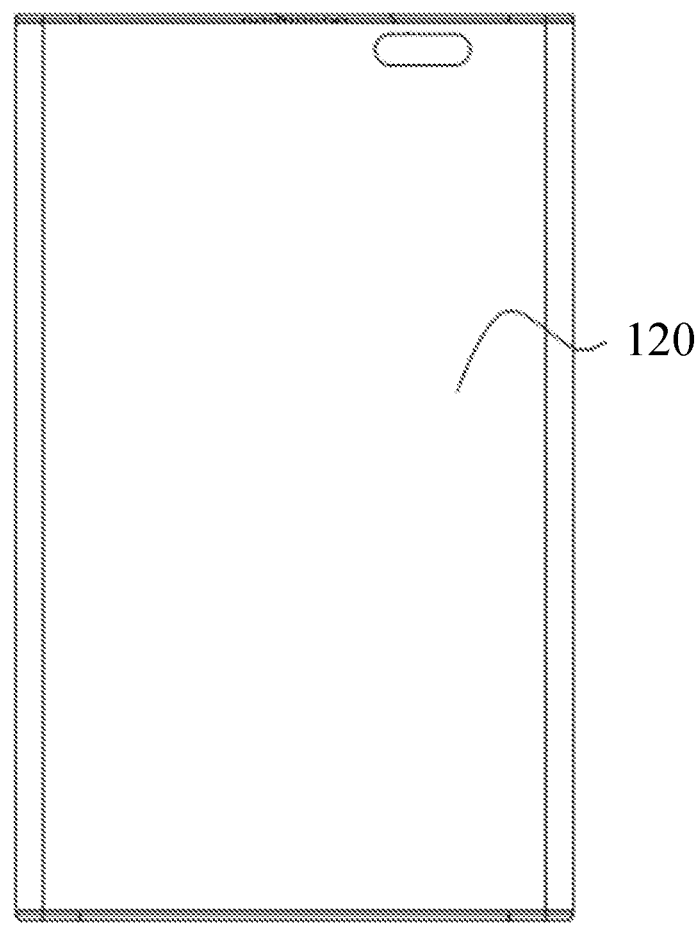
FIG. 5 is a front view of a flexible screen of an electronic device in a retracted state according to an illustrative embodiment of the present disclosure.

FIG. 1 is a partial schematic view of a flexible screen of an electronic device in a stretched state according to an illustrative embodiment of the present disclosure, FIG. 2 is a front view of a flexible screen of an electronic device in a stretched state according to an illustrative embodiment of the present disclosure, FIG. 3 is a partial sectional view of a flexible screen of an electronic device in a stretched state according to an illustrative embodiment of the present disclosure, FIG. 4 is a partial schematic view of a flexible screen of an electronic device in a retracted state according to an illustrative embodiment of the present disclosure, and FIG. 5 is a front view of a flexible screen of an electronic device in a retracted state according to an illustrative embodiment of the present disclosure. Referring to FIG. 1 to FIG. 5, an electronic device provided in the embodiments of the present disclosure includes: a housing assembly 110, an elastic stretch and retraction mechanism 200, and a flexible screen 120.

The housing assembly 110 may include a middle frame configured to assemble and protect various components of the electronic device. As an example, the housing assembly 110 may be made of a metal material such as an aluminum alloy. The housing assembly 110 may be formed by Computerized Numerical Control Machine (CNC) process and a nanometer injection molding process.

The elastic stretch and retraction mechanism 200 is assembled to the housing assembly 110. As an example, two elastic stretch and retraction mechanisms 200 are provided. The two elastic stretch and retraction mechanisms 200 are arranged oppositely.

The flexible screen 120 includes at least one stretch and retraction end 121. Part of the flexible screen 120 is fixed to the housing assembly 110. The stretch and retraction end 121 is connected to a sliding member 230 of the elastic stretch and retraction mechanism 200. The flexible screen 120 has a stretched state (refer to FIG. 1 to FIG. 3) and a retracted state (refer to FIG. 4 and FIG. 5). The stretch and retraction end 121 may drive the sliding member 230 to slide outwards from the housing assembly 110 to allow the flexible screen 120 to stretch to present the stretched state, and the stretch and retraction end 121 may also drive the sliding member 230 to reset to allow the flexible screen 120 to retract to present the retracted state. It may be understood that, when the flexible screen 120 stretches, the elastic stretch and retraction mechanism 200 is compressed. When the flexible screen 120 retracts, the elastic stretch and retraction mechanism 200 resets, thus facilitating the flexible screen 120 to present the retracted state. As an example, still referring to FIG. 3, the flexible screen 120 has two stretch and retraction ends 121. One stretch and retraction end 121 is connected to the sliding member 230 of one elastic stretch and retraction mechanism 200, and the other stretch and retraction end 121 is connected to the sliding member 230 of the other elastic stretch and retraction mechanism 200, so that two ends of the flexible screen 120 can stretch and retract relative to each other.

The electronic device provided in the embodiments of the present disclosure includes, but is not limited to, a mobile phone, a tablet computer, an iPad, a digital broadcast terminal, a messaging device, a game console, medical equipment, fitness equipment, a personal digital assistant, a smart wearable device, a smart TV, a sweeping robot, a smart speaker, a vehicle-mounted device, and the like.

Figure 6:
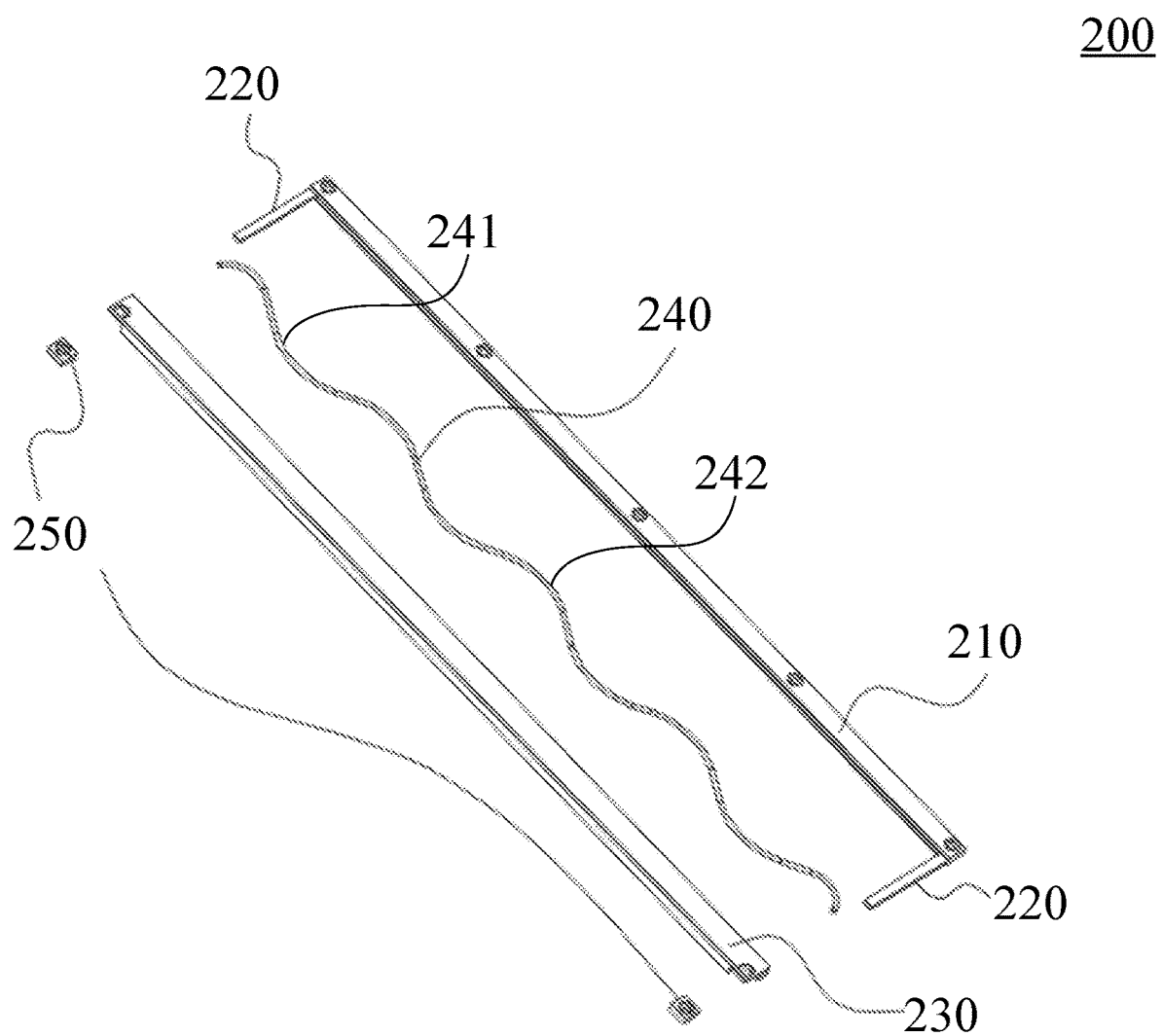
FIG. 6 is an exploded view of an elastic stretch and retraction mechanism according to an illustrative embodiment of the present disclosure.
Figure 7:
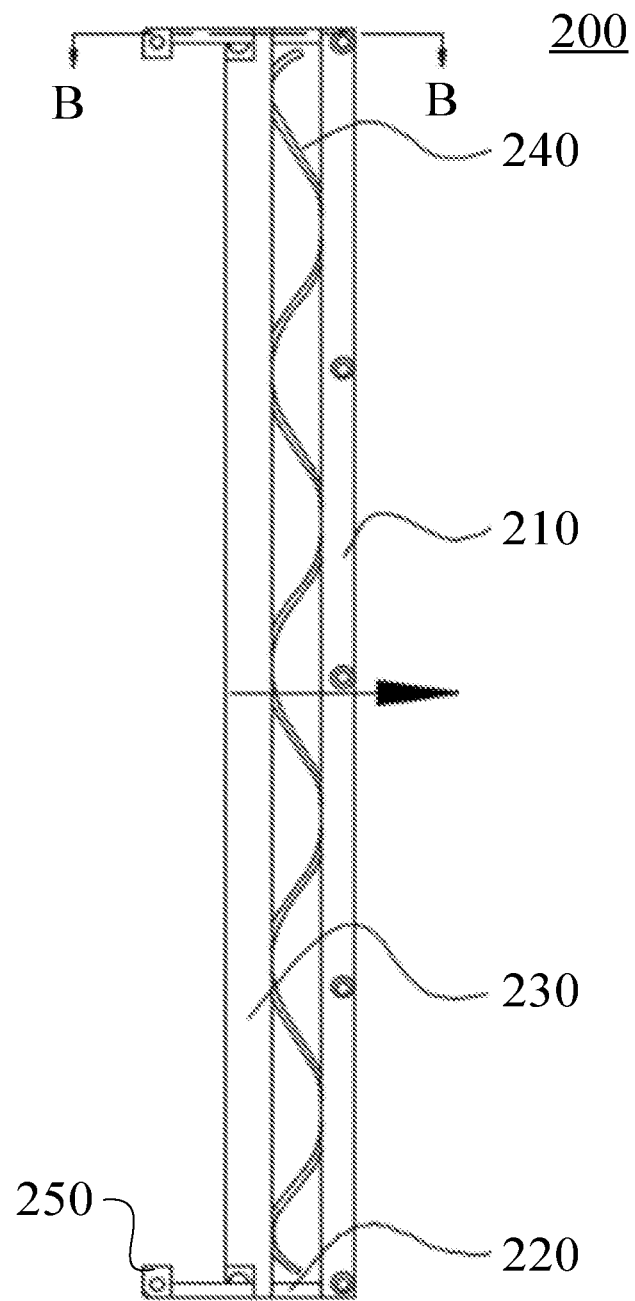
FIG. 7 is a schematic view of an elastic stretch and retraction mechanism when a flexible screen is in a stretched state according to an illustrative embodiment of the present disclosure.
Figure 8:
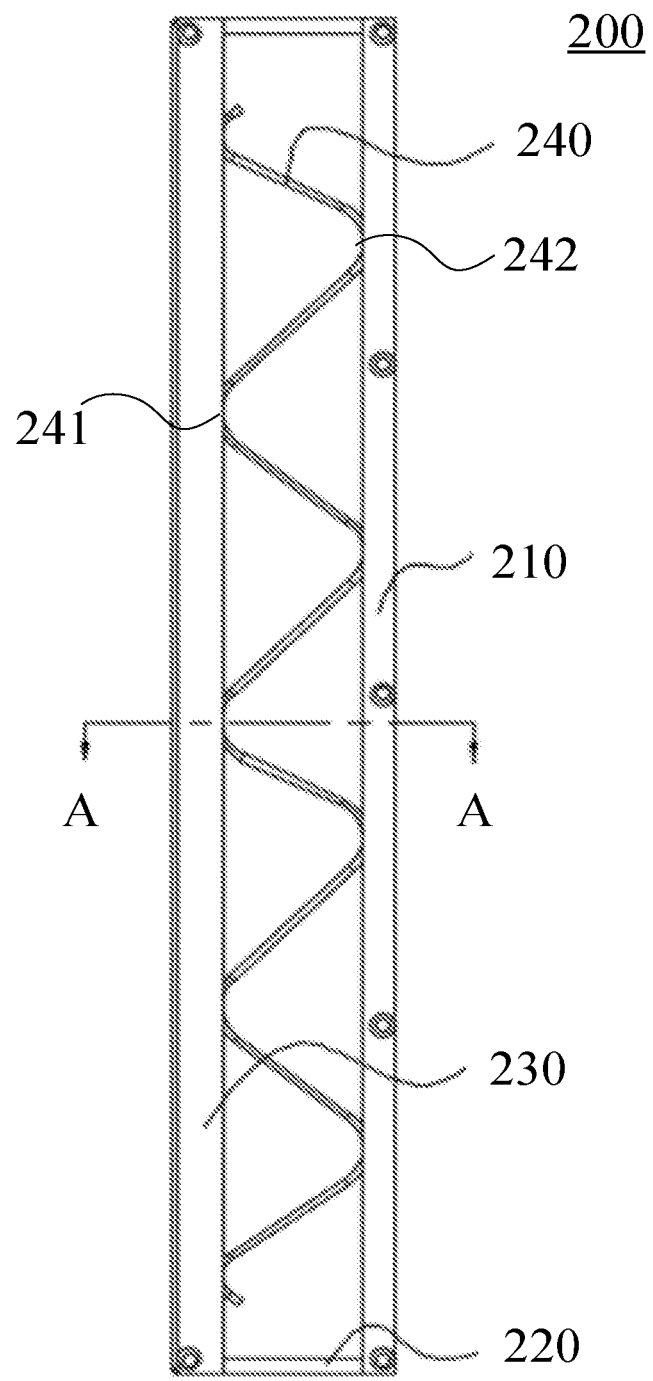
FIG. 8 is a schematic view of an elastic stretch and retraction mechanism when a flexible screen is in a retracted state according to an illustrative embodiment of the present disclosure.

FIG. 6 is an exploded view of an elastic stretch and retraction mechanism 200 according to an illustrative embodiment of the present disclosure, FIG. 7 is a schematic view of an elastic stretch and retraction mechanism 200 when a flexible screen 120 is in a stretched state according to an illustrative embodiment of the present disclosure, and FIG. 8 is a schematic view of an elastic stretch and retraction mechanism 200 when a flexible screen 120 is in a retracted state according to an illustrative embodiment of the present disclosure. Referring to FIG. 6 to FIG. 8, the elastic stretch and retraction mechanism 200 includes a fixed bracket 210, a guide member 220, a sliding member 230, and an elastic member 240.

The fixed bracket 210 is fixed to the housing assembly 110 of the electronic device. The fixed bracket 210 may be a rod-shaped structure. The fixed bracket 210 may be fixed to the housing assembly 110 through a plurality of screws 201. The plurality of screws 201 may be arranged along an extension direction of the fixed bracket 210.

The guide member 220 is connected to the fixed bracket 210. The guide member 220 may also be a rod-shaped structure. In this case, an extension direction of the guide member 220 may be perpendicular to that of the rod-shaped fixed bracket 210.

The sliding member 230 is slidably connected to the guide member 220. The sliding member 230 is configured to connect with the stretch and retraction end 121 of the flexible screen 120 of the electronic device. The guide member 220 provides guidance for the sliding member 230, and the stretch and retraction end 121 of the flexible screen 120 drives the sliding member 230 to slide on the guide member 220. The sliding member 230 may have a variety of structures, such as a rod-shaped structure. The rod-shaped sliding member 230 may be perpendicular to the rod-shaped guide member 220, and the rod-shaped sliding member 230 may also be parallel to the rod-shaped fixed bracket 210.

The elastic member 240 is arranged between the fixed bracket 210 and the sliding member 230. The elastic member 240 is configured to reset the sliding member 230. When the flexible screen 120 stretches, the stretch and retraction end 121 of the flexible screen 120 drives the sliding member 230 to slide outwards from the housing assembly 110. Under a cushioning action of the elastic member 240, the flexible screen 120 stably stretches. Referring to FIG. 3, reference numeral 202 represents a maximum distance by which the sliding member 230 slides outwards. The elastic member 240 is compressed between the fixed bracket 210 and the sliding member 230. When the flexible screen 120 retracts, the stretch and retraction end 121 of the flexible screen 120 drives the sliding member 230 to reset. Under resetting and cushioning actions of the elastic member 240, the sliding member 230 stably resets, which allows the flexible screen 120 to stably retract.

Based on the above, according to the elastic stretch and retraction mechanism 200 and the electronic device provided in the embodiments of the present disclosure, the sliding member 230 is slidably connected to the guide member 220, the elastic member 240 is arranged between the fixed bracket 210 and the sliding member 230, and the stretch and retraction end 121 of the flexible screen 120 is connected to the sliding member 230. When the stretch and retraction end 121 drives the sliding member 230 to slide outwards from the housing assembly 110, the flexible screen 120 stably stretches under the cushioning action of the elastic member 240. When the stretch and retraction end 121 drives the sliding member 230 to reset, the flexible screen 120 stably retracts under the cushioning action of the elastic member 240. The flexible screen 120 can easily and stably stretch and retract through the elastic stretch and retraction mechanism 200, which provides high operability and ensures the reliability of the use of the electronic device.

Figure 9:
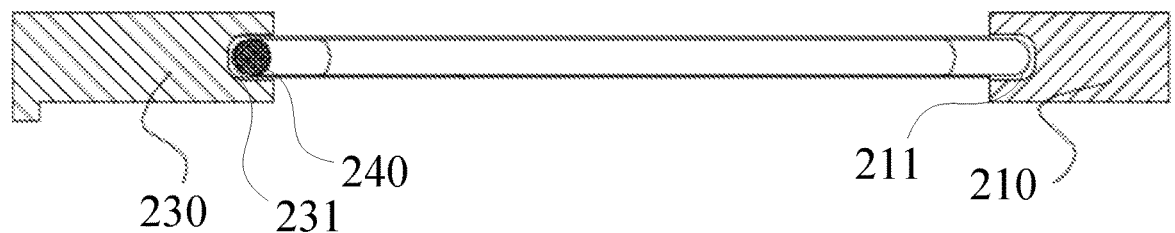
FIG. 9 is a sectional view of the elastic stretch and retraction mechanism in FIG. 8 along an A-A line.

FIG. 9 is a sectional view of the elastic stretch and retraction mechanism 200 in FIG. 8 along an A-A line. In some embodiments, referring to FIG. 9, the sliding member 230 is provided with a first limiting slot 231, the fixed bracket 210 is provided with a second limiting slot 211 opposite to the first limiting slot 231, the elastic member 240 is limited in the first limiting slot 231 and in the second limiting slot 211, and the elastic member 240 stretches and retracts along a direction from the first limiting slot 231 to the second limiting slot 211. In this way, it is convenient for the elastic member 240 to be assembled between the fixed bracket 210 and the sliding member 230, and it is convenient for the elastic member 240 to stretch and retract along the direction from the first limiting slot 231 to the second limiting slot 211.

In some embodiments, still referring to FIG. 6 and FIG. 8, the elastic member 240 includes a plurality of first abutting points 241 and a plurality of second abutting points 242, the first abutting points 241 abut in the first limiting slot 231, and the second abutting points 242 abut in the second limiting slot 211, so that the elastic member 240 stably stretches and retracts between the fixed bracket 210 and the sliding member 230. In some embodiments, the first abutting points 241 and the second abutting points 242 are alternately arranged along an extension direction of the first limiting slot 231. As an example, the first abutting point 241 and two second abutting points 242 adjacent thereto form a bended corner structure, and the second abutting point 242 and two first abutting points 241 adjacent thereto form another bended corner structure, so that the elastic member 240 has a structure similar to a wavy line along the extension direction of the first limiting slot 231 or an extension direction of the second limiting slot 211. In this way, it is convenient for the elastic member 240 to stably stretch and retract between the fixed bracket 210 and the sliding member 230, so that the sliding member 230 stably drives the stretch and retraction end 121 to stretch and retract, and then the flexible screen 120 can stably stretch and retract.

Further, in some embodiments, still referring to FIG. 6 and FIG. 8, the plurality of first abutting points 241 are uniformly distributed, and the plurality of second abutting points 242 are uniformly distributed. In this way, elastic forces generated by the plurality of first abutting points 241 are basically the same, and elastic forces generated by the plurality of second abutting points 242 are basically the same. It is more convenient for the elastic member 240 to stably stretch and retract between the fixed bracket 210 and the sliding member 230, so that the elastic member 240 applies a stable force to the sliding member 230. Thus, the sliding member 230 can stably stretch and retract under the drive of the stretch and retraction end 121 of the flexible screen 120.

Figure 10:
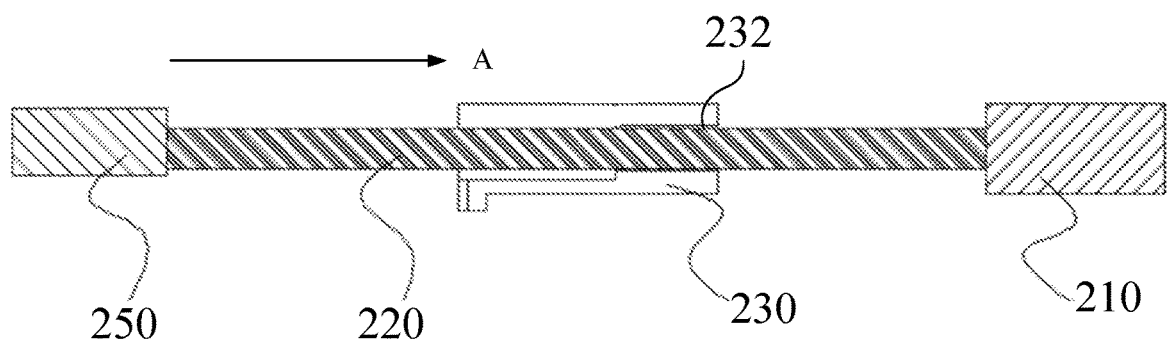
FIG. 10 is a sectional view of the elastic stretch and retraction mechanism in FIG. 7 along a B-B line.

FIG. 10 is a sectional view of the elastic stretch and retraction mechanism 200 in FIG. 7 along a B-B line. In some embodiments, referring to FIG. 10, the sliding member 230 is provided with a sliding slot 232, and the guide member 220 is slidably fitted in the sliding slot 232, so that the sliding member 230 can slide under a guiding action of the guide member 220. As an example, a cross section of the sliding slot 232 is circular, square, or has other structures. Accordingly, the guide member 220 has a structure matching the sliding slot 232.

In some embodiments, still referring to FIG. 7 and FIG. 8, two guide members 220 are provided, the two guide members 220 are oppositely arranged on two ends of the fixed bracket 210, and two ends of the sliding member 230 are slidably connected to the two guide members 220, respectively, thus facilitating the sliding member 230 to stably slide on the guide members 220.

In some embodiments, still referring to FIG. 7, FIG. 8, and FIG. 10, the elastic stretch and retraction mechanism 200 further includes a limiting member 250, the limiting member 250 is fixed to the guide member 220, and the sliding member 230 slides between the limiting member 250 and the fixed bracket 210. This avoids the sliding member 230 from being separated from the guide member 220 when sliding on the guide member 220, and a maximum sliding stroke of the sliding member 230 on the guide member 220 is restricted through the cooperation of the limiting member 250 and the fixed bracket 210. In FIG. 10, when the flexible screen 120 stretches, the sliding member 230 may slide along a direction of an arrow A from the limiting member 250 to the fixed bracket 210. When the flexible screen 120 retracts, the sliding member 230 may slide to the limiting member 250 in an opposite direction of the arrow A. The limiting member 250 may be a block structure. As an example, the limiting member 250 may be fixed to the guide member 220 by welding.

In some embodiments, the limiting member 250 is further fixed to the housing assembly 110, to be firmly assembled to the housing assembly 110. As an example, the limiting member 250 is provided with a threaded hole, and the screw 201 penetrates the housing assembly 110 to be threadedly fitted in the threaded hole, so as to firmly secure the limiting member 250 to the housing assembly 110, which also allows the elastic stretch and retraction mechanism 200 to be firmly secured to the housing assembly 110.

Based on the above, according to the elastic stretch and retraction mechanism 200 and the electronic device provided in embodiments of the present disclosure, the sliding member 230 is slidably connected to the guide member 220, the elastic member 240 is arranged between the fixed bracket 210 and the sliding member 230, and the stretch and retraction end 121 of the flexible screen 120 is connected to the sliding member 230. When the stretch and retraction end 121 drives the sliding member 230 to slide outwards from the housing assembly 110, the flexible screen 120 stably stretches under the cushioning action of the elastic member 240. When the stretch and retraction end 121 drives the sliding member 230 to reset, the flexible screen 120 stably retracts under the cushioning action of the elastic member 240. The flexible screen 120 can easily and stably stretch and retract through the elastic stretch and retraction mechanism 200, which provides high operability and ensures the reliability of the use of the electronic device. The plurality of first abutting points 241 of the elastic member 240 abut in the first limiting slot 231 of the sliding member 230, the plurality of first abutting points 241 are uniformly arranged, the plurality of second abutting points 242 abut in the second limiting slot 211 of the fixed bracket 210, and the plurality of second abutting points 242 are uniformly arranged, so that the elastic member 240 can stably stretch and retract, and thus the flexible screen 120 can stably stretch and retract, thereby improving the user experience.

The above embodiments of the present disclosure may be complementary for each other under the case of no conflict.

The above descriptions are only preferred embodiments of the present disclosure, and are not intended to limit the present disclosure. Any modification, equivalent replacement, improvement, and the like made within the spirit and principle of the present disclosure should fall within the protection scope of the present disclosure.

What is claimed is:

1. An elastic stretch and retraction mechanism for an electronic device, comprising:
   a fixed bracket fixed to a housing assembly of the electronic device;
   a guide member connected to the fixed bracket;
   a sliding member slidably connected to the guide member, and configured to connect with a stretch and retraction end of a flexible screen of the electronic device; and
   an elastic member arranged between the fixed bracket and the sliding member, and configured to reset the sliding member,
   wherein the sliding member is provided with a first limiting slot, the fixed bracket is provided with a second limiting slot opposite to the first limiting slot, the elastic member is limited in the first limiting slot and in the second limiting slot, and the elastic member is configured to stretch and retract along a direction from the first limiting slot to the second limiting slot.

2. The elastic stretch and retraction mechanism according to claim 1, wherein the elastic member comprises a plurality of first abutting points and a plurality of second abutting points, the plurality of first abutting points abut in the first limiting slot, and the plurality of second abutting points abut in the second limiting slot.

3. The elastic stretch and retraction mechanism according to claim 2, wherein the plurality of first abutting points and the plurality of second abutting points are alternately arranged along an extension direction of the first limiting slot.

4. The elastic stretch and retraction mechanism according to claim 2, wherein the plurality of first abutting points are uniformly distributed, and the plurality of second abutting points are uniformly distributed.

5. The elastic stretch and retraction mechanism according to claim 1, wherein the sliding member is provided with a sliding slot, and the guide member is slidably fitted in the sliding slot.

6. The elastic stretch and retraction mechanism according to claim 1, wherein two guide members are provided, the two guide members are oppositely arranged on two ends of the fixed bracket, and two ends of the sliding member are slidably connected to the two guide members, respectively.

7. The elastic stretch and retraction mechanism according to claim 1, further comprising a limiting member, wherein the limiting member is fixed to the guide member, and the sliding member is configured to slide between the limiting member and the fixed bracket.

8. The elastic stretch and retraction mechanism according to claim 7, wherein the limiting member is further fixed to the housing assembly.

9. The elastic stretch and retraction mechanism according to claim 8, wherein the limiting member is provided with a threaded hole, and the limiting member is fixed to the housing assembly by a screw penetrating the housing assembly to be threadedly fitted in the threaded hole.

10. An electronic device, comprising:
    a housing assembly;
    at least one elastic stretch and retraction mechanism comprising:
       a fixed bracket fixed to the housing assembly of the electronic device;
       a guide member connected to the fixed bracket;
       a sliding member slidably connected to the guide member; and
       an elastic member arranged between the fixed bracket and the sliding member, and configured to reset the sliding member; and
    a flexible screen comprising at least one stretch and retraction end, part of the flexible screen being fixed to the housing assembly, the stretch and retraction end being connected to the sliding member of the elastic stretch and retraction mechanism, the stretch and retraction end being configured to drive the sliding member to slide outwards from the housing assembly to allow the flexible screen to stretch, and the stretch and retraction end is further configured to drive the sliding member to reset to allow the flexible screen to retract,
    wherein two guide members are provided, the two guide members are oppositely arranged on two ends of the fixed bracket, and two ends of the sliding member are slidably connected to the two guide members, respectively.

11. The electronic device according to claim 10, wherein the sliding member is provided with a first limiting slot, the fixed bracket is provided with a second limiting slot opposite to the first limiting slot, the elastic member is limited in the first limiting slot and in the second limiting slot, and the elastic member is configured to stretch and retract along a direction from the first limiting slot to the second limiting slot.

12. The electronic device according to claim 11, wherein the elastic member comprises a plurality of first abutting points and a plurality of second abutting points, the plurality of first abutting points abut in the first limiting slot, and the plurality of second abutting points abut in the second limiting slot.

13. The electronic device according to claim 12, wherein the plurality of first abutting points and the plurality of second abutting points are alternately arranged along an extension direction of the first limiting slot.

14. The electronic device according to claim 12, wherein the plurality of first abutting points are uniformly distributed, and the plurality of second abutting points are uniformly distributed.

15. The electronic device according to claim 10, wherein the sliding member is provided with a sliding slot, and the guide member is slidably fitted in the sliding slot.

16. The electronic device according to claim 10, further comprising a limiting member, wherein the limiting member is fixed to the guide member, and the sliding member is configured to slide between the limiting member and the fixed bracket.

17. The electronic device according to claim 16, wherein the limiting member is further fixed to the housing assembly.

18. The electronic device according to claim 17, wherein the limiting member is provided with a threaded hole, and the limiting member is fixed to the housing assembly by a screw penetrating the housing assembly to be threadedly fitted in the threaded hole.

19. An elastic stretch and retraction mechanism for an electronic device, comprising:
    a fixed bracket fixed to a housing assembly of the electronic device;

a guide member connected to the fixed bracket;
a sliding member slidably connected to the guide member, and configured to connect with a stretch and retraction end of a flexible screen of the electronic device; and
an elastic member arranged between the fixed bracket and the sliding member, and configured to reset the sliding member,
wherein two guide members are provided, the two guide members are oppositely arranged on two ends of the fixed bracket, and two ends of the sliding member are slidably connected to the two guide members, respectively.

\* \* \* \* \*